United States Patent
Bianco

(10) Patent No.: US 11,221,949 B2
(45) Date of Patent: Jan. 11, 2022

(54) MULTI STATE PURGATORY FOR MEDIA MANAGEMENT FOR A MEMORY SUBSYSTEM

(71) Applicant: Micron Technology, Inc., Boise, ID (US)

(72) Inventor: Antonio David Bianco, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 48 days.

(21) Appl. No.: 16/786,910

(22) Filed: Feb. 10, 2020

(65) Prior Publication Data

US 2021/0248066 A1    Aug. 12, 2021

(51) Int. Cl.
*G06F 12/02* (2006.01)
*G06F 11/30* (2006.01)

(52) U.S. Cl.
CPC ...... *G06F 12/0253* (2013.01); *G06F 11/3037* (2013.01); *G06F 12/0246* (2013.01); *G06F 2212/7205* (2013.01); *G06F 2212/7209* (2013.01)

(58) Field of Classification Search
None
See application file for complete search history.

(56) References Cited

U.S. PATENT DOCUMENTS

| | | | | |
|---|---|---|---|---|
| 2015/0127922 A1* | 5/2015 | Camp | ............... | G06F 3/0659 711/206 |
| 2018/0293003 A1* | 10/2018 | Muchherla | ............ | G06F 3/0679 |
| 2018/0300235 A1* | 10/2018 | Hu | .............. | G06F 3/0688 |
| 2018/0336127 A1* | 11/2018 | Hutchison | ........... | G06F 12/0246 |
| 2020/0089430 A1* | 3/2020 | Kanno | ............... | G06F 3/0659 |
| 2021/0064291 A1* | 3/2021 | Kanno | ............... | G06F 3/0679 |

OTHER PUBLICATIONS

Microsoft. Microsoft Computer Dictionary. 2002. Microsoft Press. 5th ed. pp. 272, 278. (Year: 2002).*
Kang et al. "Superblock-based Flash Translation Layer for NAND Flash Memory." Oct. 2006. ACM. EMSOFT'06. pp. 161-170. (Year: 2006).*

* cited by examiner

*Primary Examiner* — Nathan Sadler
(74) *Attorney, Agent, or Firm* — Holland & Hart LLP

(57) ABSTRACT

Methods, systems, and devices for multi-state purgatory for garbage collection are described. A processing device can determine a valid data count for a block of data of a memory sub-system. In some case, the valid data count can indicate that the block of data contains invalid data. The processing device can assign the block of data to a first purgatory state based on the valid data count and verify that one or more read operations for the block of data in the first purgatory state are complete based on the first purgatory state. In some examples, the processing device can assign the block of data to a second purgatory state based on the verifying.

20 Claims, 4 Drawing Sheets

MULTI STATE PURGATORY FOR MEDIA MANAGEMENT FOR A MEMORY SUBSYSTEM

TECHNICAL FIELD

The following relates generally to a memory sub-system and more specifically to multi state purgatory for media management for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
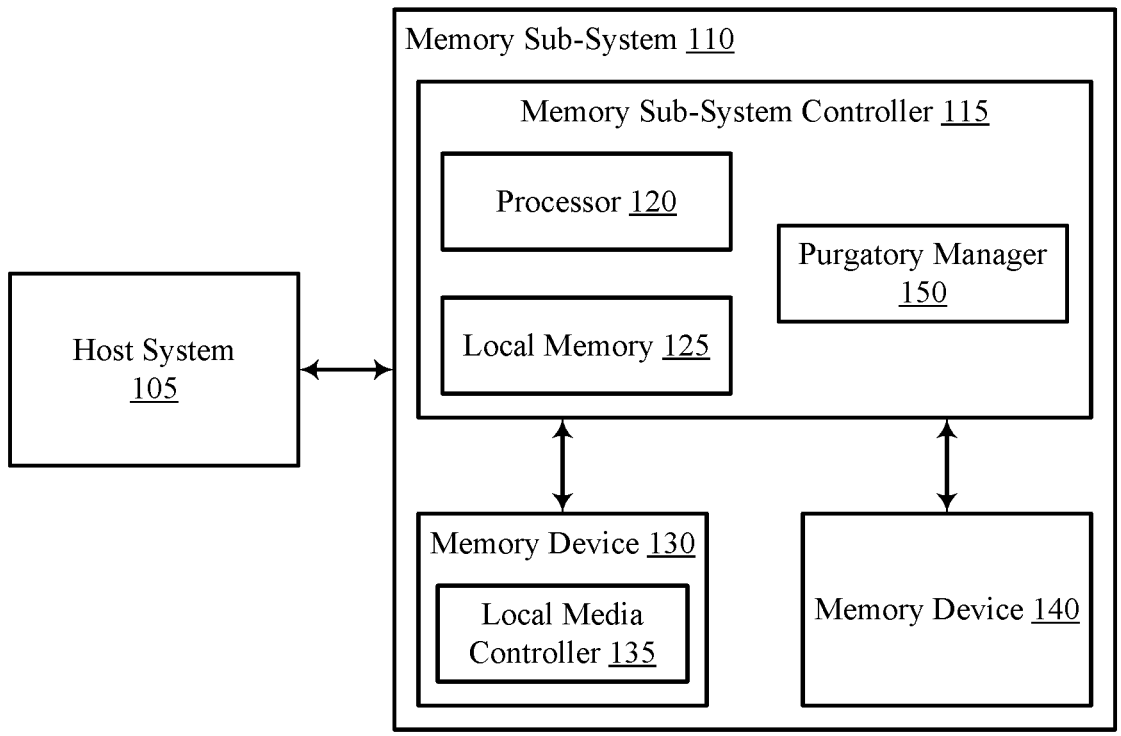
FIG. 1 illustrates an example of a computing system that includes a memory sub-system in accordance with some examples of the present disclosure.

Aspects of the present disclosure are directed to multi state purgatory for media management for a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time.

A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system controller can perform operations for media management algorithms, such as wear leveling, refresh, garbage collection, scrub, etc. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

"Garbage collection" hereinafter refers to selecting a block, rewriting the valid data from the selected block to another block, and erasing all invalid data and valid data stored at the selected block. The valid data from multiple selected blocks can be copied to a smaller number of other blocks and the selected blocks can then be erased. As a result, the number of blocks that have been erased can be increased such that more blocks are available to store subsequent data from a host system.

During garbage collection, valid data of the block to be erased is initially read into and stored by a buffer based on one or more read commands issued by a memory device controller and the corresponding page (e.g., the page on which the valid data is contained) is erased. The valid data can then be written (e.g., re-written) to the memory device (e.g., to a different page of the memory device). In order to write the valid data to a location (e.g., a different page of the memory device), write commands are issued by the memory sub-system controller, each write command indicating a memory address (e.g., a destination memory address) to which the valid data is to be written. In some garbage collection procedures, the write commands are issued once the corresponding read command has been completed. That is, a read command for data at a source memory address (e.g., a memory address on a page to be erased).

In some cases, a delay can be present between re-writing the valid data to the memory device and updating a table indicating the location of the re-written valid data. In some examples, a block of data can be erased (e.g., including the address of the re-written valid data) before updating the table indicating the location of the re-written valid data. Such techniques (e.g., erasing the data before updating the memory address) can result in the memory device experiencing a performance loss during a garbage collection procedure as a memory address location of re-written valid data are lost, which may increase the latency for future read operations to be performed on the blocks of data.

In some examples, the block of data can be held in a temporary holding pool such as a purgatory state. In traditional systems, the memory sub-system can include a single purgatory state. A single purgatory state can be for blocks of data that undergo a garbage collection procedure as well as for all blocks of data to ensure host read operations to the block of data have been completed. In such cases, the single purgatory state may cycle between holding the block of data that undergoes the garbage collection procedure and then for all blocks of data to ensure host read operations to the block of data have been completed. The memory sub-system including a single purgatory state can decrease the overall performance of the memory sub-system as host read commands and garbage collection read commands can be issued to a block of data as long as the block of data remains in the single purgatory state, which can result in increased erase times and processing times related to updating the address of the block of data to the new location.

Aspects of the present disclosure address these and other issues through the use of multi state purgatory for media management, such as garbage collection. Garbage collection is used as one example of media management operations throughout this document. For example, the block of data may be assigned to different purgatory states to hold the block of data, check the operations of the memory sub-system, and avoid deleting blocks of data prematurely (e.g., before erasing the block of data without updating the memory address). That is, when a block of data no longer contains any valid data, the block of data may not be safe to erase, so such blocks of data can be moved to purgatory states until safety can be assured. In some examples, one purgatory state can be for blocks of data that undergo garbage collection procedures, to ensure that all garbage collection read operations to the block of data has been completed. Another purgatory state can be for all blocks of data to ensure host read operations to the block of data has been completed. By assigning blocks of data to more than one purgatory state, the overall performance of the memory sub-system can be increased. For example, multi state purgatory garbage collection may improve the overall efficiency of the memory sub-system (e.g., due to latency caused by lost memory addresses of blocks of data), which can result in the memory sub-system experiencing improved read, write, and erase speeds, reduced power consumption, improved processing times, and the like.

Features of the disclosure are initially described in the context of a computing environment as described with reference to FIG. 1. Features of the disclosure are described in the context of method and block diagrams as described with reference to FIGS. 2 and 3. These and other features of the disclosure are further illustrated by and described with reference to a computer system that relates to multi state purgatory for garbage collection as described with reference to FIG. 4.

FIG. 1 illustrates an example computing system 100 that includes a memory sub-system 110 in accordance with some embodiments of the present disclosure. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory systems 110. In some examples, the host system 105 is coupled with different types of memory systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fiber Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize an non-volatile memory Express (NVMe) interface to access components (e.g., memory devices 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of non-volatile memory devices (e.g., memory device 130) includes a NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric RAM (FeRAM), magneto RAM (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM)

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a purgatory manager 150 that can assign a block of data to more than one purgatory pool (e.g., purgatory state). If the block of data becomes invalid by operations performed by the host system or due to a garbage collection procedure, the block of data can be assigned to a purgatory pool. For example, one purgatory pool can be for a block of data that undergoes a garbage collection procedure to ensure that all garbage collection read operations for that block of data (e.g., read commands to memory addresses associated with that block of data) are complete. In other examples, another purgatory pool can be for blocks of data to ensure host read operations for that block of data (e.g., read commands from a host system to memory addresses associated with that block of data) are complete. Blocks of data in the purgatory pool waiting for garbage collection reads to be completed can later be assigned to this purgatory pool to ensure there are no host reads outstanding prior to be indicated as ready for erasing.

In some cases, a valid data count for the block of data can be zero as a result of a garbage collection procedure, host system activity, or both. In such cases, purgatory manager 150 can assign the block of data to a first state (e.g., a first purgatory pool). Once assigned to the first purgatory pool, the block of data can be checked to determine whether any garbage collection reads are pending or scheduled to be performed on the block of data. After the block of data is checked that no garbage collection reads are to be performed, the purgatory manager 150 can assign the block of data to a second state (e.g., a second purgatory pool). In the second purgatory pool, the block of data is checked by the purgatory manager 150 to ensure that no host reads are pending or scheduled to be performed. After the block of data is confirmed as having no host read commands pending or scheduled, the block of data is indicated as being ready for erasure.

In some examples, the memory sub-system controller 115 includes at least a portion of the purgatory manager 150. For example, the memory sub-system controller 115 can include a processor 120 (e.g., a processing device) configured to execute instructions stored in local memory 125 for performing the operations described herein. In some examples, the purgatory manager 150 is part of the host system 105, an application, or an operating system.

The purgatory manager 150 can identify that a read command is complete (e.g., by receiving a message from the backend manager that the block of data can be erased because the read command issued to the backend manager is complete). Once the block of data is indicated as read and is erasable according to the backend manager, the purgatory manager 150 can modify the state of the block of data (e.g., by assigning the block of data to a purgatory pool). In such cases, when the purgatory manager 150 receives a read response, the purgatory manager 150 can update the purgatory pool for the block of data. Further details with regards to the operations of the purgatory manager 150 are described below.

Figure 2:
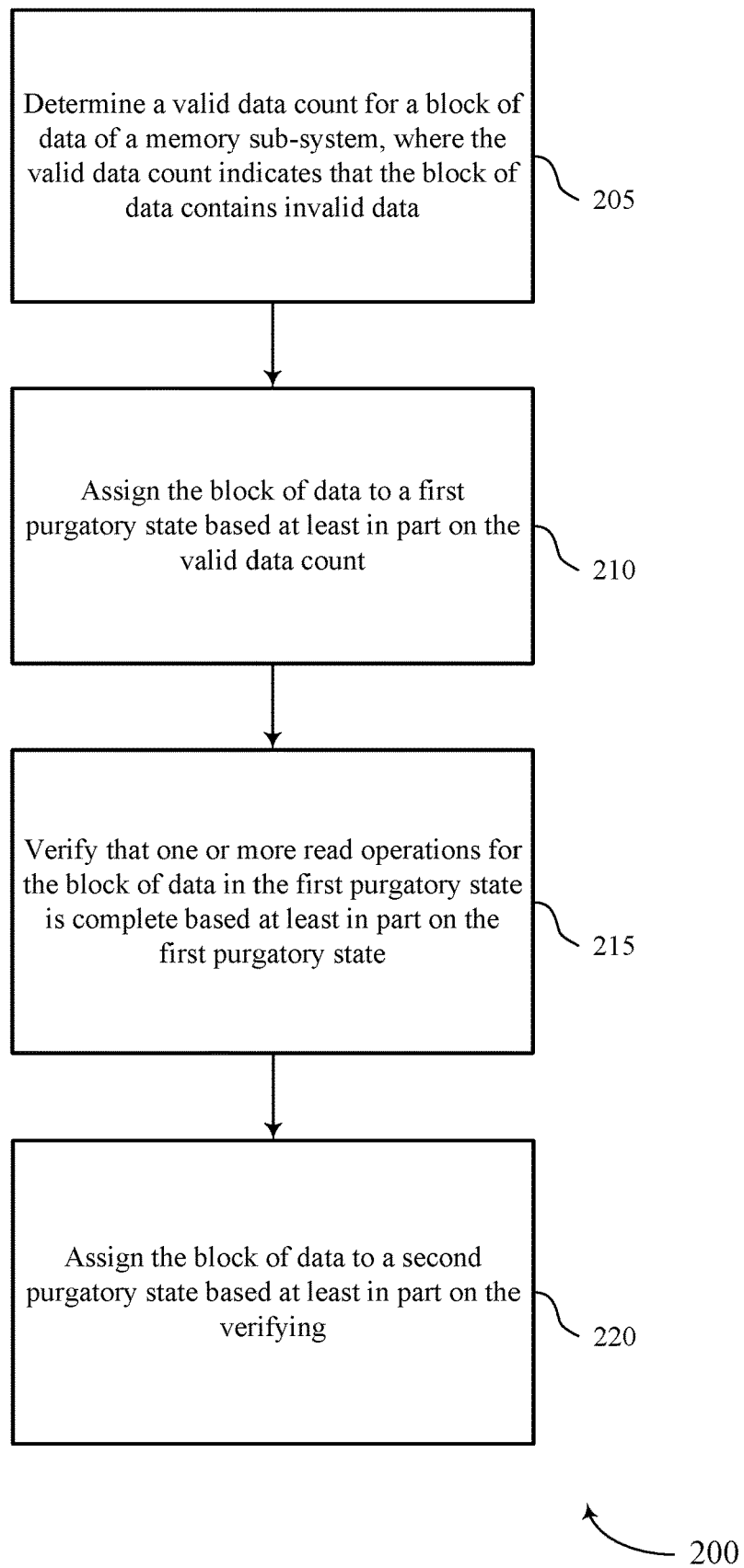
FIG. 2 is a method diagram of an example method to multi state purgatory for media management in accordance with some examples of the present disclosure.

FIG. 2 is a method diagram of an example method 200 to multi state purgatory for garbage collection in accordance with some examples of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the purgatory manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

At operation 205, the processing device can determine a valid data count for a block of data of a memory sub-system, where the valid data count indicates that the block of data contains invalid data. In some examples, the valid data count can indicate that an entirety of the block of data contains invalid data. In some examples, the valid data count can indicate that the block of data contains an amount of invalid data that exceeds a threshold amount. In some examples, the method 200 can include determining that an amount of valid data of a block of data of the set of memory components falls below a threshold. In some examples, the block of data can contain no valid data.

At operation 210, the processing device can assign the block of data to a first purgatory state based at least in part on the valid data count. In some examples, the method 200 can include assigning the block of data to a first purgatory pool based at least in part on the determination that the amount of valid data of the block of data of the set of memory components falls below the threshold. For example, the threshold can be that the amount of valid data of the block of data is less than an amount of invalid data of the block of data. The threshold can be determined based on enabling a garbage collection procedure such that if a garbage collection procedure is enabled, the threshold can be defined differently than if garbage collection is disabled or not being performed. In other examples, the threshold can be set based on an amount of read operations for the block of data.

At operation 215, the processing device can verify that one or more read operations for the block of data in the first purgatory state is complete based at least in part on the first purgatory state. In some examples, verifying that one or more read operations for the block of data in the first purgatory state is complete can include verifying that all read operations of a garbage collection procedure for the block of data are complete. In some examples, verifying that one or more read operations for the block of data in the first purgatory state is complete can include verifying that all host read operations for the block of data from a host system are complete.

At operation 220, the processing device can assign the block of data to a second purgatory state based at least in part on the verifying. In some examples, the method 200 can include verifying, after assigning the block of data to the second purgatory state, that all host read operations for the block of data in the second purgatory state are complete. In some examples, the method 200 can include erasing the block of data after verifying that all read operations of the garbage collection procedure for the block of data are complete and that all host read operations for the block of data in the second purgatory state are complete. In some examples, the method 200 can include flushing both a host cursor associated with the block of data and a garbage collection cursor associated with the block of data before erasing the block of data.

In some examples, the method 200 can include assigning the block of data to a second purgatory pool based at least in part on completion of one or more read operations for the block of data in the first purgatory pool. In some examples, the one or more read operations can be associated with a garbage collection procedure for the block of data. In some examples, the method 200 can include determining that all host read operations from a host system for the block of data in the second purgatory pool are complete. In some examples, the method 200 can include assigning the block of data to an erase pool after determining that all host read operations from the host system for the block of data in the second purgatory pool are complete. In some examples, the method 200 can include erasing the block of data after assigning the block of data to the erase pool.

Figure 3:
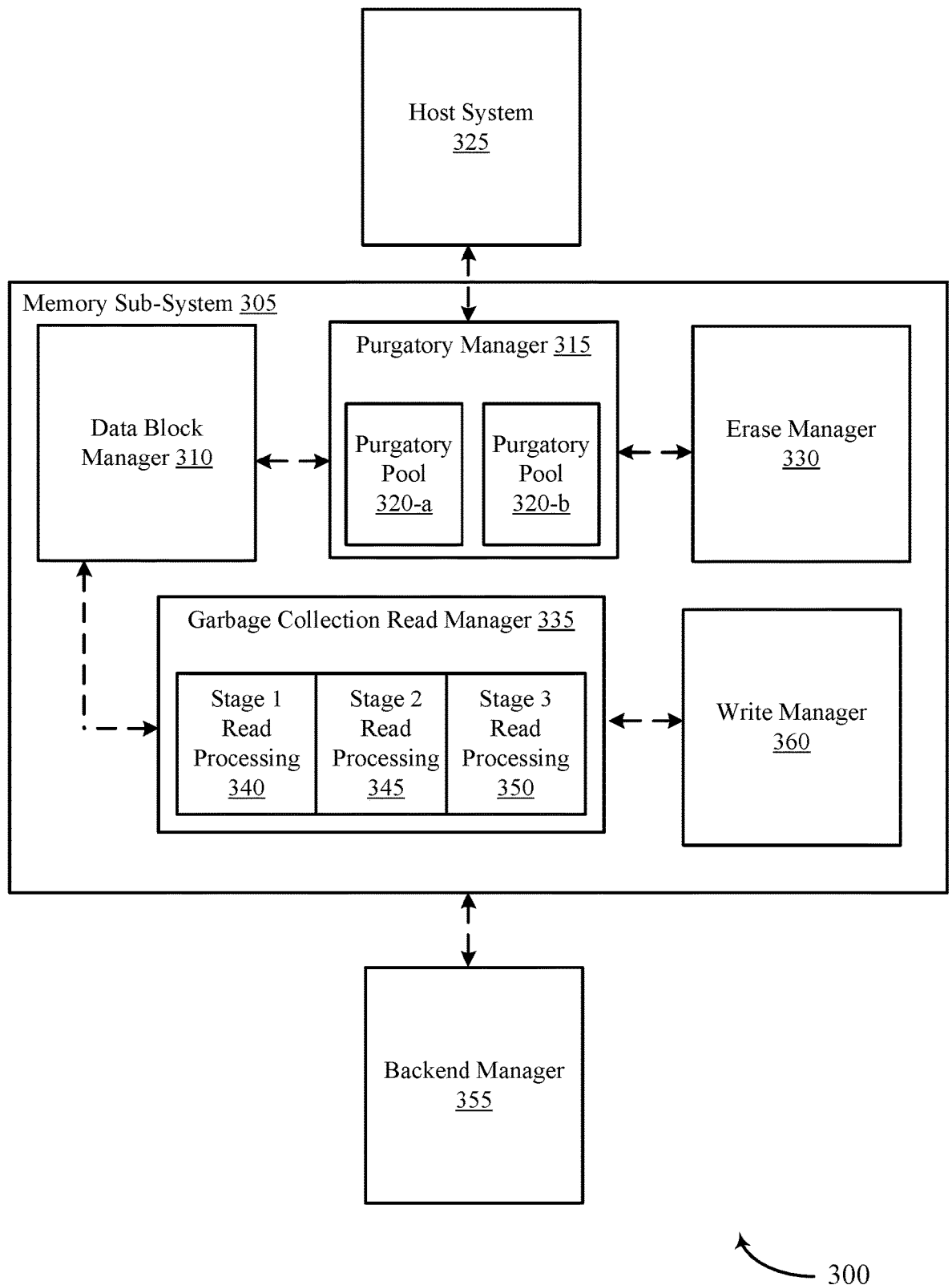
FIG. 3 is a block diagram of an example system that multi state purgatory for media management can operate.

FIG. 3 is a block diagram 300 of an example system that multi state purgatory for garbage collection can operate. The block diagram 300 can include memory sub-system 305. Memory sub-system 305 can include data block manager 310, purgatory manager 315, erase manager 330, garbage collection read manager 335, and write manager 360. The block diagram 300 also includes host system 325 and backend manager 355.

In some examples, data block manager 310 can identify a block of data that does not undergo a garbage collection procedure. In some cases, invalid data can be present in the block of data. For example, the invalid data can exceed a threshold amount of invalid data or the entirety of the block of data may contain invalid data. In such cases, the block of data can be modified by purgatory manager 315 in communication with data block manager 310, which can modify or assign a state to the block of data. Purgatory manager 315 can assign the block of data to one of purgatory pool 320-a and purgatory pool 320-b, though in some cases, purgatory manager 315 can include more than two purgatory pools.

If data block manager 310 identifies that the block of data does not undergo garbage collection procedure and invalid data is present in the block of data, the block of data can forgo being assigned to purgatory pool 320-a and instead can be assigned to purgatory pool 320-b. In such cases, the block of data can be assigned to purgatory pool 320-b included in purgatory manager 315. Once assigned to purgatory pool 320-b, the block of data is checked to ensure that the block of data does not have pending or scheduled read commands from host system 325.

Purgatory manager 315 can be in communication with host system 325. To confirm that the block of data cannot receive a read command, purgatory manager 315 can check with host system 325 for read commands for the block of data. If no read commands are present from host system 325, purgatory manager 315 can release the block of data from purgatory pool 320-b and instruct erase manager 330 to erase the block of data. In such cases, purgatory manager 315 may be in communication with erase manager 330.

According to some aspects, data block manager 310 can select one or more blocks of data for the garbage collection procedure. Data block manager 310 can send an indication of the selected one or more blocks of data to garbage collection read manager 335. Data block manager 310 can in communication with garbage collection read manager 335. Garbage collection read manager 335 can include stage 1 read processing 340, stage 2 read processing 345, and stage 3 read processing 350. Stage 1 read processing 340 can check a scoreboard of garbage collection read manager 335 ensure there is an empty entry. Stage 2 read processing 345 can check the scoreboard of the garbage collection read manager 335 for the next entry marked valid. Stage 3 read processing 350 can check the scoreboard of the garbage collection read manager 335 for the next entry marked valid.

In some examples, garbage collection read manager 335 can receive a read response from backend manager 355, which is in response to a read command issued by garbage collection read manager 335. In such cases, garbage collection read manager 335 can process the read command and store a value to be read. The garbage collection read manager 335 can be in communication with write manager 360. Write manager 360 can write the value to a destination location (e.g., memory cell within the memory sub-system 305).

While the block of data undergoes the garbage collection procedure, data block manager 310 can identify that the block of data includes invalid data. For example, the block of data can include invalid data when an entirety of the block of data is read. In such cases, backend manager 355 can transmit a message indicating that the entire block of data is read, and the invalid data can be erased. In some examples, backend manager 355 can be in communication with data block manager 310 to communicate that invalid data is present on the block of data.

After the block of data is selected for the garbage collection procedure or when the block of data undergoing garbage collection contains invalid data (e.g., a threshold amount of invalid data), the block of data can be assigned to purgatory pool 320-a while the block of data undergoes the garbage collection procedure. After backend manager 355 sends the values read from the block of data to garbage collection read manager 335 and garbage collection read operations cease, the block of data can be assigned to purgatory pool 320-b. In such cases, data block manager 310 can identify that the block of data contains invalid data, and the block of data can be sent to purgatory pool 320-b. Purgatory manager 315 can then check with host system 325 for read commands on the block of data to confirm that the block of data does not have any pending read commands. If no read commands are pending or scheduled by host system 325, purgatory manager 315 can instruct erase manager 330 to erase the block of data.

In some cases, before erase manager 330 erases the block of data, a host cursor and a garbage collection cursor can be flushed. In such cases, the cursors of read operations or erase operations that follow erasing the initial block of data can be flushed. If there is invalid data on the block of data, and no active reads outstanding for the block of data, flushing the host cursor and the garbage collection cursor can be omitted.

Figure 4:
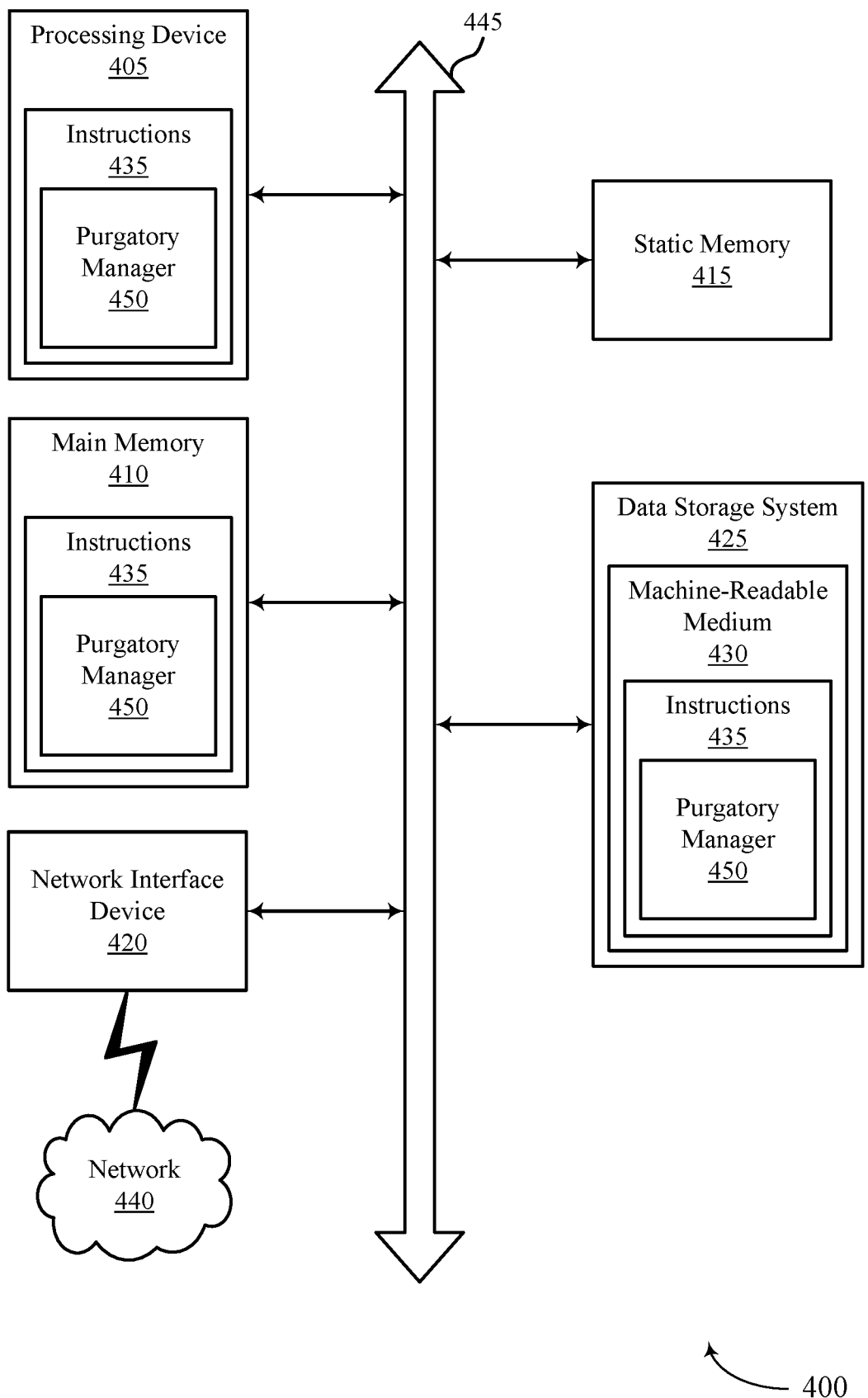
FIG. 4 is a block diagram of an example computer system in which examples of the present disclosure can operate.

FIG. 4 is a block diagram of an example computer system in which examples of the present disclosure can operate. The computer system 400 can include a set of instructions, for causing the machine to perform any one or more of the techniques described herein. In some examples, the computer system 400 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the purgatory manager 150 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 400 can include a processing device 405, a main memory 410 (e.g., ROM, flash memory, DRAM such as SDRAM or Rambus DRAM (RDRAM), etc.), a static memory 415 (e.g., flash memory, static RAM (SRAM), etc.), and a data storage system 425, which communicate with each other via a bus 445.

Processing device 405 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 405 can also be one or more special-purpose processing devices such as an ASIC, an FPGA, a DSP, network processor, or the like. The processing device 405 is configured to execute instructions 435 for performing the operations and steps discussed herein. The computer system 400 can further include a network interface device 420 to communicate over the network 440.

The data storage system 425 can include a machine-readable storage medium 430 (also known as a computer-readable medium) on which is stored one or more sets of instructions 435 or software embodying any one or more of the methodologies or functions described herein. The instructions 435 can also reside, completely or at least partially, within the main memory 410 and/or within the processing device 405 during execution thereof by the computer system 400, the main memory 410 and the processing device 405 also constituting machine-readable storage media. The machine-readable storage medium 430, data storage system 425, and/or main memory 410 can correspond to a memory sub-system.

In one example, the instructions 435 include instructions to implement functionality corresponding to a purgatory manager 450 (e.g., the purgatory manager 150 described with reference to FIG. 1). While the machine-readable storage medium 430 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method comprising:
    determining a valid data count for a block of data of a memory sub-system, wherein the valid data count indicates that the block of data contains invalid data;
    assigning the block of data to a first purgatory state associated with a garbage collection procedure based at least in part on the valid data count;
    verifying that one or more read operations for the block of data in the first purgatory state are complete based at least in part on the first purgatory state;
    assigning the block of data to a second purgatory state associated with host read operations based at least in part on the verifying; and
    erasing the block of data based at least in part on assigning the block of data to the second purgatory state and verifying that the one or more read operations are complete.

2. The method of claim 1, wherein verifying that the one or more read operations for the block of data in the first purgatory state are complete comprises:
    verifying that all read operations of the garbage collection procedure for the block of data are complete.

3. The method of claim 2, further comprising:
verifying, after assigning the block of data to the second purgatory state, that all the host read operations for the block of data in the second purgatory state are complete.

4. The method of claim 3, further comprising:
erasing the block of data after verifying that all read operations of the garbage collection procedure for the block of data are complete and that all the host read operations for the block of data in the second purgatory state are complete.

5. The method of claim 4, further comprising:
flushing both a host cursor associated with the block of data and a garbage collection cursor associated with the block of data before erasing the block of data, wherein flushing both the host cursor and the garbage collection cursor comprises emptying contents of the host cursor and the garbage collection cursor.

6. The method of claim 1, wherein verifying that the one or more read operations for the block of data in the first purgatory state are complete comprises:
verifying that all the host read operations for the block of data from a host system are complete.

7. The method of claim 1, wherein the valid data count indicates that an entirety of the block of data contains invalid data.

8. The method of claim 1, wherein the valid data count indicates that the block of data contains an amount of invalid data that exceeds a threshold amount.

9. A non-transitory computer-readable storage medium comprising instructions that, when executed by a processing device, cause the processing device to:
determine a valid data count for a block of data of a memory sub-system, wherein the valid data count indicates that the block of data contains invalid data;
assign the block of data to a first purgatory state associated with a garbage collection procedure based at least in part on the valid data count;
verify that one or more read operations for the block of data in the first purgatory state are complete based at least in part on the first purgatory state;
assign the block of data to a second purgatory state associated with host read operations based at least in part on the verifying; and
erase the block of data based at least in part on assigning the block of data to the second purgatory state and verifying that the one or more read operations are complete.

10. The non-transitory computer-readable storage medium of claim 9, wherein the processing device is further to:
verify that all the host read operations for the block of data from a host system are complete.

11. The non-transitory computer-readable storage medium of claim 9, wherein the processing device is further to:
verify that all read operations of the garbage collection procedure for the block of data are complete.

12. The non-transitory computer-readable storage medium of claim 11, wherein the processing device is further to:
verify, after assigning the block of data to the second purgatory state, that all the host read operations for the block of data in the second purgatory state are complete.

13. The non-transitory computer-readable storage medium of claim 12, wherein the processing device is further to:
erase the block of data after verifying that all read operations of the garbage collection procedure for the block of data are complete and that all the host read operations for the block of data in the second purgatory state are complete.

14. The non-transitory computer-readable storage medium of claim 9, wherein the valid data count indicates that an entirety of the block of data contains invalid data.

15. A system comprising:
a plurality of memory components; and
a processing device, operatively coupled with the plurality of memory components, to:
determine that an amount of valid data of a block of data of the plurality of memory components falls below a threshold;
assign the block of data to a first purgatory pool associated with a garbage collection procedure based at least in part on the determination that the amount of valid data of the block of data of the plurality of memory components falls below the threshold;
assign the block of data to a second purgatory pool associated with host read operations based at least in part on completion of one or more read operations for the block of data in the first purgatory pool; and
erase the block of data based at least in part on assigning the block of data to the second purgatory pool and verifying that the one or more read operations are complete.

16. The system of claim 15, wherein the one or more read operations are associated with the garbage collection procedure for the block of data.

17. The system of claim 15, further comprising:
the processing device further to:
determine that all the host read operations from a host system for the block of data in the second purgatory pool are complete.

18. The system of claim 17, further comprising:
the processing device further to:
assign the block of data to an erase pool after determining that all the host read operations from the host system for the block of data in the second purgatory pool are complete.

19. The system of claim 18, further comprising:
the processing device further to:
erase the block of data after assigning the block of data to the erase pool.

20. The system of claim 15, wherein the block of data contains no valid data.

* * * * *